(12) United States Patent
Kang

(10) Patent No.: US 11,851,003 B2
(45) Date of Patent: Dec. 26, 2023

(54) DRIVING ASSISTANCE SYSTEM AND METHOD FOR DRIVER

(71) Applicant: HYUNDAI MOBIS Co., Ltd., Seoul (KR)

(72) Inventor: Tae Hoon Kang, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/506,038

(22) Filed: Oct. 20, 2021

(65) Prior Publication Data
US 2022/0118909 A1 Apr. 21, 2022

(30) Foreign Application Priority Data
Oct. 21, 2020 (KR) .................. 10-2020-0136846

(51) Int. Cl.
| | | |
|---|---|---|
| *B60R 1/00* | (2022.01) | |
| *G06T 7/70* | (2017.01) | |
| *G06V 10/60* | (2022.01) | |
| *G06V 20/56* | (2022.01) | |
| *G06V 20/59* | (2022.01) | |

(Continued)

(52) U.S. Cl.
CPC .............. *B60R 1/00* (2013.01); *G06T 7/70* (2017.01); *G06V 10/60* (2022.01); *G06V 20/56* (2022.01); *G06V 20/597* (2022.01); *G06V 40/161* (2022.01); *G06V 40/18* (2022.01); *B60R 2300/307* (2013.01); *B60R 2300/80* (2013.01); *G06T 2207/30252* (2013.01)

(58) Field of Classification Search
CPC ...... G06V 10/60; G06V 20/56; G06V 20/597; G06V 40/161; G06V 40/18; G06T 2207/30201; G06T 2207/30252; G06T 2207/30268; G06T 7/70; G06T 7/73; B60R 1/00; B60R 2300/307; B60R 2300/80; B60R 11/04; B60R 21/0134; B60W 40/08; B60W 40/02; B60W 50/14; B60W 2050/146; B60W 2420/42; B60K 35/00; B60K 2370/152; B60K 2370/21; B60K 2370/52; B60K 2370/736; H04N 23/57

See application file for complete search history.

(56) References Cited

U.S. PATENT DOCUMENTS

| | | | | |
|---|---|---|---|---|
| 2015/0009010 A1* | 1/2015 | Biemer | .................... | G06F 21/32 340/5.83 |
| 2018/0039846 A1* | 2/2018 | Grubb | .................... | G06V 40/19 |
| 2019/0007626 A1* | 1/2019 | Kirsch | ...................... | B60R 1/00 |

(Continued)

FOREIGN PATENT DOCUMENTS

KR 10-1655197 B1 9/2016

*Primary Examiner* — Farzana Hossain
(74) *Attorney, Agent, or Firm* — MORGAN, LEWIS & BOCKIUS LLP

(57) ABSTRACT

A driving assistance system and method for a driver including a sensor that senses a state in front of a vehicle corresponding to a driver's field of vision through a vehicle windshield; a detector that photographs the driver's face and detects an illumination distribution of the face or a state of the driver based on a photographed image of the driver; and a processor that determines whether or not the driver's glare occurs based on the state in front of the vehicle sensed by the sensor and the illumination distribution of the face or the state of the driver detected by the detector are disclosed.

16 Claims, 6 Drawing Sheets

(51) Int. Cl.
*G06V 40/18* (2022.01)
*G06V 40/16* (2022.01)

(56) References Cited

U.S. PATENT DOCUMENTS

| | | | |
|---|---|---|---|
| 2019/0071095 A1* | 3/2019 | Hashimoto | B60W 40/08 |
| 2019/0146297 A1* | 5/2019 | Lynam | G02F 1/161 |
| | | | 359/265 |
| 2019/0315275 A1* | 10/2019 | Kim | B60R 1/00 |
| 2020/0401818 A1* | 12/2020 | Gibert Castroverde | |
| | | | G06V 40/20 |
| 2021/0114439 A1* | 4/2021 | Moschek | B60R 11/04 |
| 2021/0245739 A1* | 8/2021 | Verburg | B60W 50/08 |

* cited by examiner

DRIVING ASSISTANCE SYSTEM AND METHOD FOR DRIVER

CROSS REFERENCE TO RELATED APPLICATION

The present application claims priority to Korean Patent Application No. 10-2020-0136846, filed Oct. 21, 2020, the entire contents of which is incorporated herein for all purposes by this reference.

BACKGROUND

Technical Field

The present disclosure relates to a technology capable of monitoring whether a driver's glare occurs by sunlight and the like and assisting the driver's driving.

Description of the Related Art

In general, there is a trend to extend a windshield on a vehicle front so that visibility is sufficiently secured and a bright interior atmosphere is created. In particular, the front windshield is gradually becoming larger in order to secure the front view directly related to safety.

However, as the front windshield of the vehicle becomes larger, the driver's field of vision is widened, but the amount of sunlight incident through the front windshield and the amount of light that obstructs the driver's view are relatively increased, which act as factors impeding safe driving. In particular, when driving while facing the sun, the driver may temporarily lose the front view due to glare in severe cases.

Conventionally, in order to prevent the driver's glare by sunlight, the glass surface of the vehicle was tinted or the sun visor was manually operated.

However, tinting the entire front windshield can cause a secondary accident by obscuring the driver's view. In the case of a manual sun visor, there is an inconvenience in that the sun visor has to be manually operated according to the movement of sunlight with respect to the top/left/right of the field of view in a moving vehicle.

The matters described as the background art above are only for improving the understanding of the background of the present disclosure, and should not be taken as acknowledging that they correspond to the prior art already known to those of ordinary skill in the art.

SUMMARY

The present disclosure has been proposed to solve this problem, and a purpose of the present disclosure is to provide a system and method for assisting a vehicle driving by preventing the driver's glare caused by a light source located in front of the vehicle.

In order to achieve the above purpose, the driving assistance system for a driving according to the present disclosure includes: a sensor that senses a state in front of a vehicle corresponding to a driver's field of vision through a vehicle windshield; a detector that photographs the driver's face and detects an illumination distribution of the face or a state of the driver based on a photographed image of the driver; and a processor that determines whether or not the driver's glare occurs based on the state in front of the vehicle sensed by the sensor and the illumination distribution of the face or the state of the driver detected by the detector.

The sensor may be connected to a front camera that is installed to face the front of the vehicle and photographs an image of the front of the vehicle and may sense a light source from the front image photographed by the front camera.

The sensor may divide the front image into a plurality of ranges and sense a location of the light source based on an illuminance of each divided range.

The detector may be connected to a recognition camera that is installed to face the driver in an interior of the vehicle and photographs the driver's facial image.

The detector may recognize the driver's eyes from the facial image photographed by the recognition camera and detect the state of the driver based on the recognized driver's eyes.

The detector may recognize the driver's eyeball area from the facial image photographed by the recognition camera and detect an illuminance of a divided eyeball area.

The processor may determine that the driver's glare occurs when the detector detects the illumination distribution of the face in a state where the illuminance of the eyeball area is equal to or greater than a predetermined illumination, or when the detector detects the state of the driver where an opening of the driver's eyes is equal to or less than a predetermined opening amount.

The system may further include a front camera that is installed on the vehicle and photographs the front of the vehicle; and a controller that displays the front image photographed by the front camera on a display device when the processor determines the driver's glare occurs.

The controller may vary an illuminance distribution of the front image photographed by the front camera and display the image with the varied illuminance distribution on the display device.

In order to achieve the above purpose, the driving assistance method for a driver according to the present disclosure includes the steps of: sensing a state in front of a vehicle corresponding to a driver's field of vision through a vehicle windshield, and photographing the driver's face; detecting an illumination distribution of a face or a state of the driver based on the photographed image of the driver; and determining whether or not the driver's glare occurs based on the photographed front image of the vehicle and the detected illuminance distribution of the face or the detected state of the driver.

The step of sensing the state in front of the vehicle and photographing the driver's face may further include the step of sensing a light source from a photographed front image after the step of photographing an image of the front of the vehicle with a front camera installed to face the front of the vehicle, sensing the state in front of the vehicle and photographing the driver's face.

In the step of sensing the light source, the front image may be divided into a plurality of ranges, and a location of the light source may be sensed based on an illuminance of each divided range.

In the step of sensing the state in front of the vehicle and photographing the driver's face, the driver's facial image may be photographed with a recognition camera installed to face the driver in an interior of the vehicle.

In the step of detecting the illuminance distribution of the face or the state of the driver, the driver's eyes may be recognized from the facial image photographed by the recognition camera, and the state of the driver may be detected based on the recognized driver's eyes.

In the step of detecting the illuminance distribution of the face or the state of the driver, the driver's eyeball area may be recognized from the facial image photographed by the recognition camera, and an illuminance of a divided eyeball area may be detected.

In the step of determining whether the driver's glare occurs, it may be determined that the driver's glare occurs when the illuminance distribution of the face is detected in a state where an illuminance of the eyeball area is equal to or greater than a predetermined illuminance, or when the state of the driver where an opening of the driver's eyes is equal to or less than a predetermined opening amount is detected.

The method may further include the step of displaying a front image photographed by a front camera photographing the front of the vehicle on a display device when it is determined that the driver's glare occurs, after the step of determining whether or not the driver's glare occurs.

In the step of displaying of the front image, an illuminance distribution of the front image photographed by the front camera may be varied and the image with the varied illuminance distribution may be displayed on the display device.

According to the driving assistance system and method for a driver of the present disclosure, there is an effect of determining whether or not the driver's glare occurs in the view from which the driver looks forward of the vehicle.

In addition, when the driver's glare is determined, a front image is displayed to the driver, and a phenomenon in which backlight is generated in the front image can be prevented.

DETAILED DESCRIPTION

Figure 1:
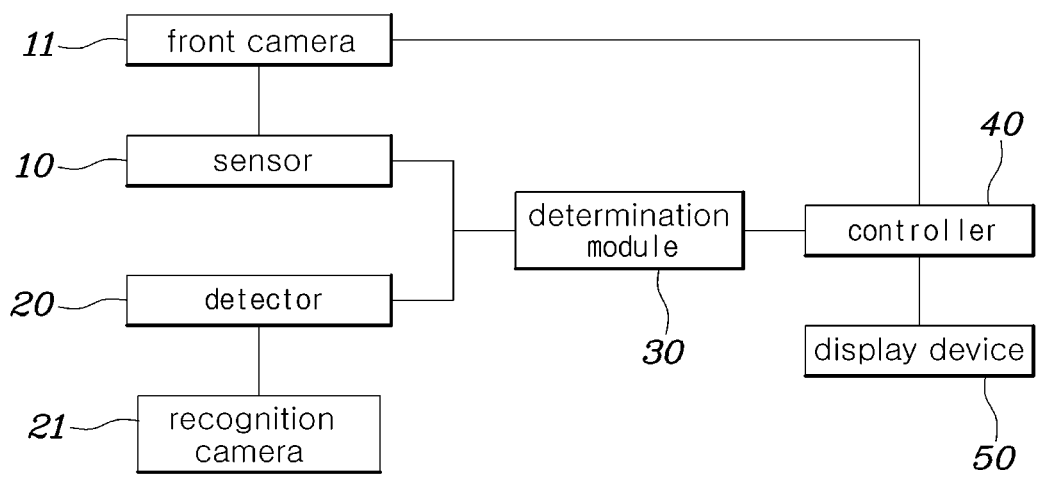
FIG. 1 is a block diagram of a driving assistance system for a driver according to an embodiment of the present disclosure.

Specific structural or functional descriptions of the embodiments of the present disclosure disclosed in the present specification or application are only exemplified for the purpose of describing the embodiments according to the present disclosure, and the embodiments according to the present disclosure are implemented in various forms and should not be construed as being limited to the embodiments described in the present specification or application.

Since the embodiment according to the present disclosure may have various changes and forms, specific embodiments will be illustrated in the drawings and described in detail in the present specification or application. However, this is not intended to limit the embodiment according to the concept of the present disclosure with respect to a specific disclosed form, and should be understood to include all changes, equivalents or substitutes included in the spirit and scope of the present disclosure.

Terms such as first and/or second may be used to describe various elements, but the elements should not be limited by the terms. The above terms are used only for the purpose of distinguishing one element from another element, for example, without departing from the scope of the present disclosure, a first element may be termed a second element, and similarly the second component may also be referred to as the first component.

When a component is referred to as being "connected" or "contacted" to another component, it may be directly connected or contacted to another component, but it is understood that another component may exist in between. On the other hand, when it is said that a certain element is "directly connected" or "directly contacted" to another element, it should be understood that another element does not exist in the middle. Other expressions describing the relationship between elements, such as "between" and "immediately between" or "adjacent to" and "directly adjacent to", etc., should be interpreted similarly.

The terms used herein are used only to describe specific embodiments, and are not intended to limit the present disclosure. The singular expression includes the plural expression unless the context clearly dictates otherwise. In this specification, terms such as "comprise" or "have" are intended to designate that an embodied feature, number, step, operation, component, part, or combination thereof exists, and it should be understood that it does not preclude in advance the possibility of the existence or addition of one or more other features or numbers, steps, operations, components, parts, or combinations thereof.

Unless defined otherwise, all terms used herein, including technical and scientific terms, have the same meaning as commonly understood by one of ordinary skill in the art to which this disclosure belongs. Terms such as those defined in commonly used dictionaries should be interpreted as meanings consistent with the context of the related art, and unless explicitly defined in the present specification, they are not to be interpreted in an ideal or excessively formal meaning.

Hereinafter, the present disclosure will be described in detail by describing preferred embodiments of the present disclosure with reference to the accompanying drawings. Like reference numerals in each figure indicate like elements.

FIG. 1 is a block diagram of a driving assistance system for a driver according to an embodiment of the present disclosure.

Referring to FIG. 1, a driving assistance system for a driver according to an embodiment of the present disclosure includes: a sensor 10 that senses a state in front of a vehicle corresponding to a driver's field of vision through a vehicle windshield; a detector 20 that photographs the driver's face and detects an illuminance distribution of the face or a state of the driver based on the photographed image of the driver; and a determinator module 30 that determines whether or not the driver's glare occurs based on the state in front of the vehicle sensed by the sensor 10 and the illuminance distribution of the face or the state of the driver detected by the detector 20.

The sensor 10, the detector 20, the determinator module 30, and the controller 40 according to an exemplary embodiment of the present disclosure may be implemented by an algorithm configured to control the operations of various components of a vehicle, a non-volatile memory (not shown) configured to store data relating to software instructions for reproducing the algorithm, and a processor (not shown) configured to perform the operations described below using the data stored in the memory. Here, the memory and the processor may be implemented as separate chips. Alternatively, the memory and processor may be implemented as a single chip integrated with each other. A processor may take the form of one or more processors.

In addition, the sensor 10, the detector 20, the determinator module 30, and the controller 40 according to an exemplary embodiment of the present disclosure may communicate with each other through a communication method such as CAN, LIN, MOST and the like, but the present disclosure is not limited thereto.

The sensor 10 senses a state in front of the vehicle, where the front of the vehicle may be a range corresponding to the field of view that the driver sees through the vehicle windshield. In particular, the sensor 10 may detect a state such as illuminance or light distribution introduced from the front of the vehicle.

The detector 20 may photograph the driver's face and detect an illuminance distribution of the face from the photographed facial image. In particular, the detector 20 may detect the illuminance around the driver's face and eyes by detecting the illuminance distribution reflected on the driver's face.

In addition, the detector 20 may detect the driver's facial expression or the state of eyes open from the driver's face. Specifically, the detector 20 may detect whether the driver's expression is a frown expression or the driver's eyes are slightly opened or closed, and the like.

The determinator module 30 may determine whether or not the driver's glaring occurs based on the state in front of the vehicle sensed by the sensor 10 and the illuminance distribution of the face or the state of the driver detected by the detector 20.

Specifically, the determinator module 30 may determine that the driver's glare occurs when the illuminance flowing through the windshield is strong which is sensed at the front of the vehicle by the sensor 10 and when the facial expression of the driver detected by the detector 20 is a frown expression or the driver's eyes are slightly opened or closed, or the illuminance around the driver's eyes is strong.

Therefore, according to the present disclosure, there is an effect of determining whether or not the driver's glare occurs in the driver's field of view looking ahead of the vehicle.

Figure 2:
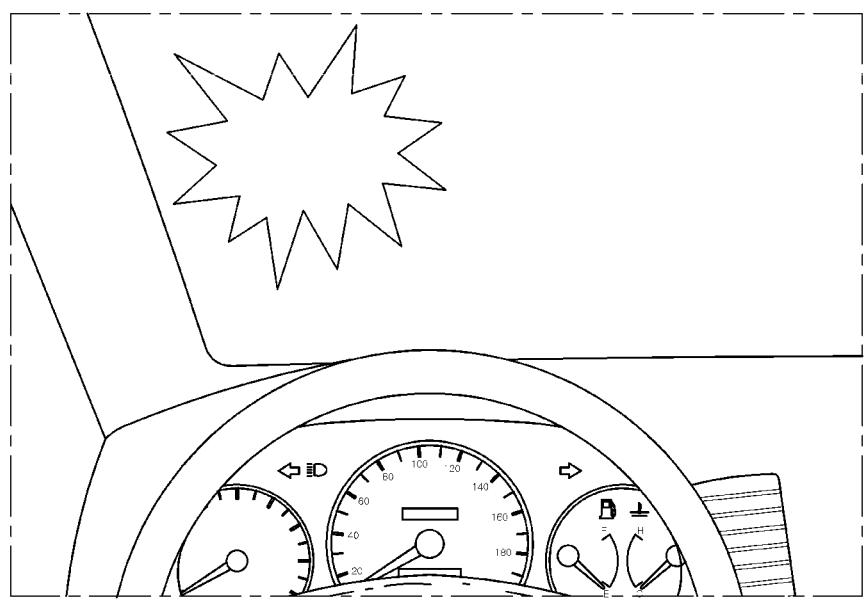
FIG. 2 is a diagram illustrating a front image of a vehicle photographed by a front camera according to an embodiment of the present disclosure.

FIG. 2 illustrates a front image of a vehicle photographed by a front camera 11 according to an embodiment of the present disclosure.

Referring further to FIG. 2, the sensor 10 is connected to the front camera 11 that is installed to face the front of the vehicle and photographs an image of the front of the vehicle, and the sensor 10 can sense a light source from the front image photographed by the front camera 11.

Here, the light source may be the sun, and may be a light irradiated from the front or a reflector that reflects ambient light.

In one embodiment, the front camera 11 may be a multifunction front recognition camera 21 which is a multi function camera (MFC). The multifunction front recognition camera 21 detects the shape information on the objects located in front of the vehicle, such as vehicles, lanes, road boundaries, signs, two-wheeled vehicles, pedestrians, the lamp of an opposite vehicle and the like. In particular, in a case where a stereo camera is used, distance information may be additionally obtained.

Specifically, the multifunctional front recognition camera 21 is composed of a device that blocks indoor reflected light and shields electromagnetic waves, a camera module composed of an image sensor and a lens, a digital signal processing processor that converts and analyzes the collected image information, a microcomputer and the like.

In another embodiment, the front camera 11 may be a camera facing the front of vehicle, and may be a camera for photographing the front of the vehicle to form a Surround View Monitor (SVM).

In particular, the front camera 11 is located inside the vehicle, and the front camera 11 can photograph the outside of the vehicle through the windshield in the interior of the vehicle.

Figure 3:
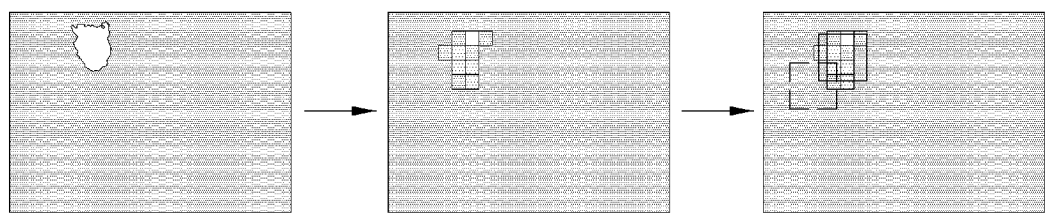
FIG. 3 illustrates a process for sensing a location of a light source according to an embodiment of the present disclosure.
Figure 4:
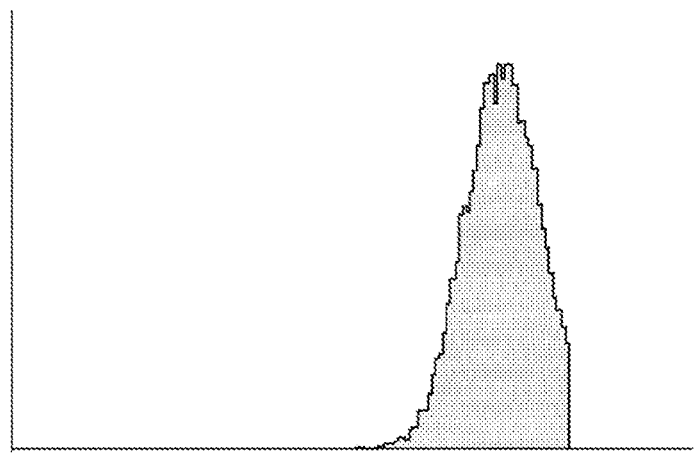
FIG. 4 is a histogram of illuminance around a light source according to an embodiment of the present disclosure.

FIG. 3 illustrates a process of sensing a location of a light source according to an embodiment of the present disclosure, and FIG. 4 illustrates a histogram of illuminance around the light source according to an embodiment of the present disclosure.

Referring further to FIGS. 3 to 4, the sensor 10 may divide the front image into a plurality of ranges (pixels), and sense the location of the light source based on the illuminance of each of the divided ranges.

The sensor 10 may determine whether the average value of the light value (LV) of the front image is equal to or greater than a predetermined average illuminance. Also, the sensor 10 may divide the front image into a plurality of ranges (pixels) and sense the illuminance of the plurality of ranges.

Also, when the sensor 10 determines that the average value of the illuminance of the front image is equal to or greater than the predetermined average illuminance, the front image may be pre-processed. In particular, a plurality of ranges for the front image is colored as hue (H), saturation (S), and value (V) of a Hue Saturation Value (HSV) model, or preprocessing may be performed to express an image with brightness information using a gray model. In another embodiment, the sensor 10 may process the front image as an RGB model.

Also, the sensor 10 may generate a binary map where a pixel constituting the front image is processed as white when the image pixel intensity is equal to or greater than a predetermined brightness, and the pixel is processed as black when the image pixel intensity is less than the predetermined brightness. The sensor 10 may sense that the light source is located in a portion treated with white in the generated binary map.

Additionally, the sensor 10 may extract a maximum set having the largest size among the pixel sets composed of white in the binary map through a labeling algorithm. The sensor 10 may sense that the light source is located in the maximum set having the largest size and extract a histogram around the maximum set having the largest size.

In addition, the sensor 10 may project the front image on the binary map through a back projection process and sense the center point of the light source therefrom. In particular, it is possible to extract a histogram for the maximum set having the largest size through the back projection on the binary map, and sense the location of the light source from the distribution of the extracted histogram.

In one embodiment, when the light source is the sun, the histogram distribution around the sun is as shown in FIG. 4.

Figure 5:
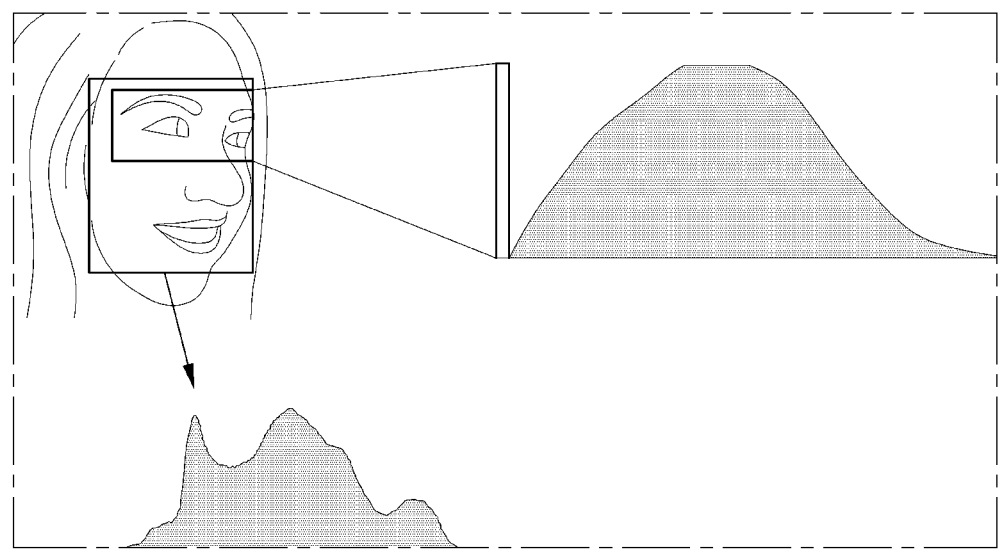
FIG. 5 illustrates a facial image of a driver and a histogram of illuminance around the face and eyes according to an embodiment of the present disclosure.

FIG. 5 illustrates a facial image of a driver and a histogram of illuminance around the face and eyes according to an embodiment of the present disclosure.

The detector 20 may be connected to the recognition camera 21 that is installed to face the driver in the interior of the vehicle and photographs the driver's facial image.

In one embodiment, the recognition camera 21 may be a Driver State Warning (DSW) camera. The recognition camera 21 may photograph the driver's facial image while facing the driver's face, and the detector 20 may detect the state of the driver from the photographed driver's facial image.

In one embodiment, the detector 20 may recognize the driver's eyes from the facial image photographed by the recognition camera 21, and detect the state of the driver based on the recognized driver's eyes.

The detector 20 may recognize the driver's eyes from the facial image photographed by the recognition camera 21. In one embodiment, the detector 20 may extract a feature point corresponding to the eye from the facial image, and in another embodiment, the detector 20 may histogram the illuminance distribution for each pixel to recognize the driver's eyes. The driver's facial image and the histogram of the illuminance distribution around the eyes may be extracted as shown in FIG. 5, and the detector 20 may recognize the eyes through the histogram of the illuminance distribution of the facial image.

In particular, the detector 20 may detect the driver's facial expression or the driver's eye opening state based on the driver's eyes recognized from the facial image photographed by the recognition camera 21. For example, the detector 20 may detect whether the recognized driver's eyes are in a grimaced state, or whether the driver's eyes continue to remain closed or whether the driver's eyes continue to remain open slightly, and the like.

That is, the detector 20 may detect whether or not the driver's field of view is not secured as the driver's eyes are irradiated with strong light.

In another embodiment, the detector 20 may recognize the driver's eyeball area from the facial image photographed by the recognition camera 21 and detect the illuminance of the divided eyeball area.

Specifically, the detector 20 may detect the illuminance of the eyeball area around the driver's eyes by dividing the facial image into the facial area and the eyeball area and detecting the illuminance of each area.

In one embodiment, the detector 20 may detect a difference between the average illuminance of the facial area and the average illuminance of the eyeball area. If the difference between the average illuminance for the facial area and the average illuminance for the eyeball area is equal to or greater than a predetermined illuminance difference, the determinator module 30 may determine there is the driver's glare state. Specifically, the detector 20 may extract the average of the Y data histogram.

The determinator module 30 may determine that the driver's glare occurs when the detector 20 detects the illuminance distribution of the face as the illuminance of the eyeball area equal to or greater than a predetermined illuminance, or when the detector 20 detects the state of the driver as an opening of the driver's eyes equal to or less than a predetermined opening amount.

Also, the determinator module 30 may determine the driver's glare occurs when the average value of the illuminance of the front image sensed by the sensor 10 is greater than a predetermined range (normal illuminance condition).

The system may further include the front camera 11 that is installed on the vehicle and photographs the front of the vehicle; and the controller 40 that displays the front image photographed by the front camera 11 on a display device 50 (e.g., a screen) when the determinator module 30 determines that the driver's glare occurs.

Specifically, the front camera 11 may photograph the front image in a WIDE mode (wide area visible up to the left/right road). In addition, the controller 40 may crop and display the front image so that the lower bumper of the vehicle and the road below are not visible so that the front image is close to the driver's field of view.

In particular, the controller 40 may vary the illuminance distribution for the front image photographed by the front camera 11, and display the image with the varied illuminance distribution on the display device 50.

In one embodiment, the controller 40 may vary the illuminance distribution of the front image by performing preprocessing such as histogram equalization on the front image photographed by the front camera 11.

That is, the controller 40 may vary the illuminance distribution of the front image so as to attenuate the difference in the illuminance distribution in order to prevent a phenomenon in which backlight is generated in the front image by the light source sensed by the sensor 10.

Figure 6:
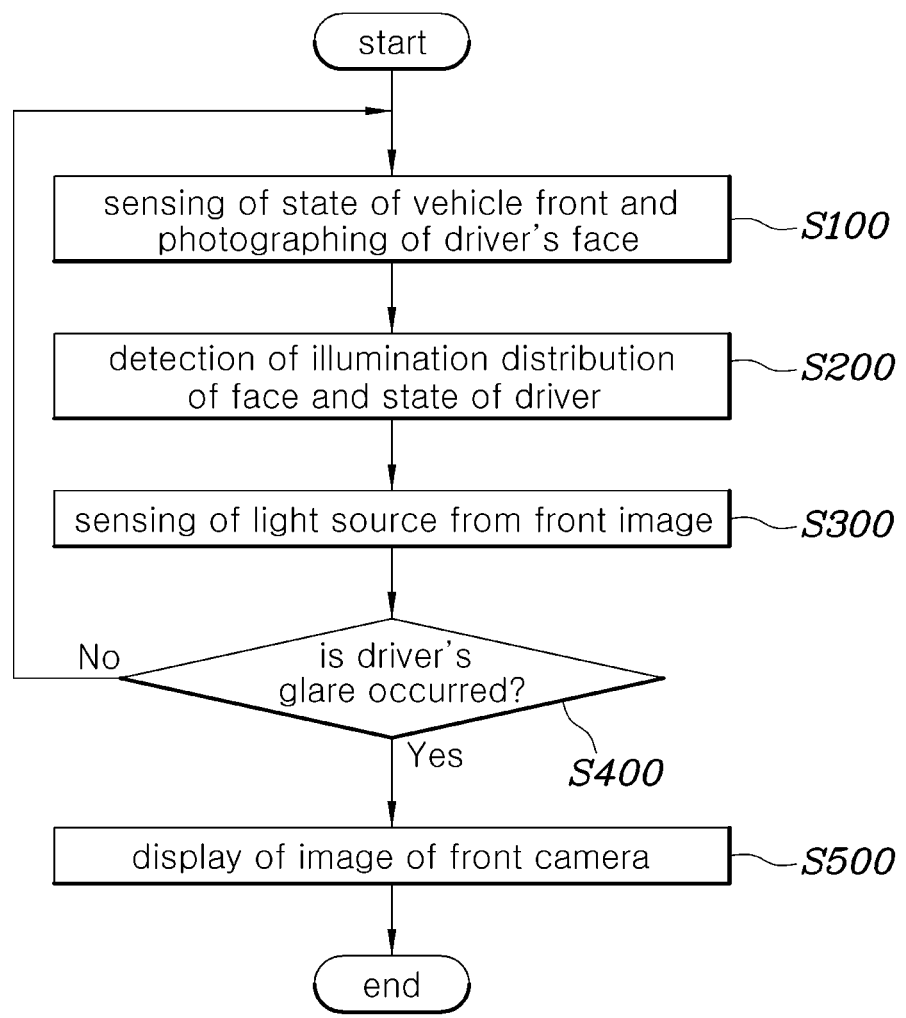
FIG. 6 is a flowchart of a driving assistance method for a driver according to an embodiment of the present disclosure.

FIG. 6 is a flowchart of a driving assistance method for a driver according to an embodiment of the present disclosure.

Reference further to FIG. 6, the driving assistance method for a driver according to an embodiment of the present disclosure includes the steps of sensing a state in front of the vehicle corresponding to the driver's field of view through the vehicle windshield, and photographing the driver's face (S100); detecting the illumination distribution of the face or the state of the driver based on the photographed image of the driver (S200); and determining whether or not the driver's glare occurs based on the photographed front image of the vehicle and the detected illuminance distribution of the face or the detected state of the driver (S400).

The step of sensing the state in front of the vehicle and photographing the driver's face (S100) may further include the step of sensing a light source from the photographed front image (S300), after the step of photographing the image of the front of the vehicle with the front camera 11 installed to face the front of the vehicle, sensing the state in front of the vehicle and photographing the driver's face.

In the step of sensing the light source (S300), the front image may be divided into a plurality of ranges, and the location of the light source may be sensed based on the illuminance of each divided range.

In the step of sensing the state in front of the vehicle and photographing the driver's face (S100), the driver's facial image may be photographed with the recognition camera 21 installed to face the driver in the interior of the vehicle.

In the step of detecting the illuminance distribution of the face or the state of the driver (S200), the driver's eyes are recognized from the facial image photographed by the recognition camera 21, and the state of the driver may be detected based on the recognized driver's eyes.

In step of detecting the illuminance distribution of the face or the state of the driver (S200), the driver's eyeball area may be recognized from the facial image photographed by the recognition camera 21, and the illuminance of the divided eyeball area may be detected.

In the step of determining whether or not the driver's glare occurs (S400), it is determined that the driver's glare occurs when the illuminance distribution of the face is detected as the illumination of the eyeball area equal to or greater than a predetermined illuminance or the state of the driver is detected as the opening of the driver's eyes equal to or less than a predetermined opening amount.

After the step of determining whether or not the driver's glare occurs (S400), the method may further include the step of displaying the front image photographed by the front camera 11 photographing the front of the vehicle on the display device 50 when it is determined that the driver's glare occurs (S500).

In the step of displaying the front image (S500), the illuminance distribution of the front image photographed by the front camera 11 may be varied, and the image with the varied illuminance distribution may be displayed on the display device 50.

Although shown and described with respect to specific embodiments of the present disclosure, it will be apparent to those of ordinary skill in the art that the present disclosure can be variously improved and changed without departing from the spirit of the present disclosure provided by the following claims.

What is claimed is:

1. A driving assistance system for a driver, comprising:
   a sensor configured to sense a state in front of a vehicle corresponding to a driver's field of vision through a vehicle windshield;
   a recognition camera configured to photograph a face of the driver; and
   a processor configured to:
   detect an illumination distribution of the face or a state of the driver based on a photographed image of the driver photographed by the recognition camera, and
   determine whether or not a glare by light at the driver occurs based on the state in front of the vehicle sensed by the sensor and the illumination distribution of the face or the state of the driver;
   a front camera that is installed on the vehicle and obtains a front image of the vehicle; and
   a controller configured to display the front image photographed by the front camera on a display device in response to determining the glare,
   wherein the controller varies an illuminance distribution of the front image photographed by the front camera so as to attenuate differences in the illuminance distribution of the front image, and displays the front image with the varied illuminance distribution on the display device.

2. The driving assistance system for a driver according to claim 1, wherein the sensor is connected to the front camera that is installed to face the front of the vehicle and photographs the front image of the vehicle, and senses a light source from the front image photographed by the front camera.

3. The driving assistance system for a driver according to claim 2, wherein the sensor divides the front image into a plurality of ranges, and senses a location of the light source based on an illuminance of each of the divided ranges.

4. The driving assistance system for a driver according to claim 1, wherein the recognition camera is installed to face the driver in an interior of the vehicle and photographs a facial image of the driver.

5. The driving assistance system for a driver according to claim 4, wherein the processor recognizes eyes of the driver from the facial image photographed by the recognition camera, and detects the state of the driver based on the recognized eyes of the driver.

6. The driving assistance system for a driver according to claim 4, wherein the processor recognizes an eyeball area of the driver from the facial image photographed by the recognition camera, and detects an illuminance of a divided eyeball area.

7. The driving assistance system for a driver according to claim 1, wherein the processor determines that the glare occurs when the processor detects the illumination distribution of the face in a state where the illuminance of the eyeball area is greater than or equal to a predetermined illumination, or when the processor detects the state of the driver where an opening amount of the eyes of the driver is less than or equal to a predetermined opening amount.

8. The driving assistance system for a driver according to claim 1, wherein the controller is further configured to crop the front image and display the cropped front image on the display device.

9. A driving assistance method for a driver, comprising steps of:
   sensing a state in front of a vehicle corresponding to a field of vision of the driver through a vehicle windshield, and photographing a face of the driver;
   detecting an illumination distribution of the face or a state of the driver based on a photographed image of the driver;
   determining whether or not a glare by light at the driver occurs based on a front image of the vehicle, photographed by a front camera photographing a front of the vehicle, and the detected illuminance distribution of the face or the detected state of the driver; and
   displaying the front image photographed by the front camera on a display device in response to determining the glare,
   wherein in the step of displaying of the front image, an illuminance distribution of the front image photographed by the front camera is varied so as to attenuate differences in the illuminance distribution of the front image, and the front image with the varied illuminance distribution is displayed on the display device.

10. The driving assistance method for a driver according to claim 9, wherein the step of sensing the state in front of the vehicle and photographing the face of the driver further comprises a step of sensing a light source from the front image, after photographing an image of the front of the vehicle with the front camera installed to face the front of the vehicle, sensing the state in front of the vehicle, and photographing the face of the driver.

11. The driving assistance method for a driver according to claim 10, wherein in the step of sensing the light source, the front image is divided into a plurality of ranges, and a location of the light source is sensed based on an illuminance of each of the divided ranges.

12. The driving assistance method for a driver according to claim 9, wherein in the step of sensing the state in front of the vehicle and photographing the face of the driver, a facial image of the driver is photographed with a recognition camera installed to face the driver in an interior of the vehicle.

13. The driving assistance method for a driver according to claim 12, wherein in the step of detecting the illuminance distribution of the face or the state of the driver, eyes of the driver are recognized from the facial image photographed by the recognition camera, and the state of the driver is detected based on the recognized eyes of the driver.

14. The driving assistance method for a driver according to claim 12, wherein in the step of detecting the illuminance distribution of the face or the state of the driver, an eyeball area of the driver is recognized from the facial image photographed by the recognition camera, and an illuminance of a divided eyeball area is detected.

15. The driving assistance method for a driver according to claim 9, wherein in the step of determining whether the glare by light at the driver occurs, the glare is determined to occur when the illuminance distribution of the face is detected in a state where an illuminance of the eyeball area is greater than or equal to a predetermined illuminance, or when the state of the driver where an opening amount of the eyes of the driver is less than or equal to a predetermined opening amount is detected.

16. The driving assistance method for a driver according to claim 9, wherein in the step of displaying of the front image, the front image is cropped and the cropped front image is displayed on the display device.

\* \* \* \* \*